Patented Feb. 20, 1934

1,948,069

UNITED STATES PATENT OFFICE 1,948,069

PRODUCTION OF PARAFORMALDEHYDE

Otto Fuchs and Erich Naujoks, Constance, Germany, assignors to Deutsche Gold- und Silber-Scheideanstalt vormals Roessler, Frankfort-on-the-Main, Germany, a company of Germany No Drawing. Application March 16, 1932, Serial No. 599,346, and in Germany March 21, 1931

4 Claims. (Cl. 260—140)

It is known that paraformaldehyde of commerce, a complicated mixture of variously constituted polymers, is produced by evaporating, under reduced pressure, solutions of formaldehyde that are as concentrated as possible. Notwithstanding the employment of vacuum, the last stage of this process, in which the paraformaldehyde has already separated out as very tough gelatinous masses or as masses which finally form hard lumps, requires a rather great amount of time and comparatively high temperatures, because the last fractions of water are very difficult to remove by themselves. In addition to this, the supply of heat in such circumstances involves difficulties.

Stable solutions of formaldehyde—i. e. solutions which remain clear—can be prepared only up to concentrations of about 30 per cent; in the simultaneous presence of methyl alcohol or other hydroxyl organic compounds, especially univalent or polyvalent alcohols, 40 per cent. solutions are also still stable. Thus, these solutions of comparatively low concentration would long ago have been replaced by the high grade and, besides, more easily transportable, solid products, if an aqueous solution could have been produced more readily therefrom. In order to obtain concentrated solutions from the hitherto commercially usual paraformaldehyde, it has, however, been necessary to heat it for a fairly long time with water and even under pressure at temperatures above 100° C.

It has now been found that the last stage of the water-removing process, which lasts so long in spite of the employment of vacuum and requires too high temperatures, is substantially responsible for the extensive polymerization and consequently, for the difficult solubility or the difficulty of splitting up of the paraformaldehyde produced as hereinbefore described. We have further found that a substantial shortening of the process, precisely in regard to this end stage, can be obtained and especially the excessive heating can be completely avoided if the removal of the water is accelerated in a manner known per se by the formation of an azeotropic mixture with suitable organic liquids; the polymerization product in this case is found in a substantially more favorable form which is readily worked upon by stirring devices and the like. Moreover, the product that results is at the outset much poorer in water and, consequently, in this condition as well as in the complete drying, is inclined to extensive polymerization to a much smaller extent than is the known product.

Substances such as the following come into consideration as auxiliary liquids for the formation of suitable azeotropic mixtures:—toluene, ethyl acetate, methyl ethyl ketone, diethyl formal, mesityl oxide, ethylene chloride and other substances that boil within similar limits. Ternary azeotropic mixtures—e. g. that occurring in the simultaneous presence of ethyl alcohol and diethyl formal—may also be used. The carrying out of the process with the aid of ethyl acetate is, for example, as follows:—

1000 gms. of ethyl acetate are heated in a round-bottomed flask provided with a tall Raschig column. At a point two-thirds of the way up the column, 1 kg. of a 40 per cent. by volume solution of formaldehyde, which solution is poor in methyl alcohol, is run in through a lateral inlet drop by drop and at such a speed that the quantity of the formaldehyde solution added agrees approximately with the water distilling over with the ethyl acetate. The azeotropic mixture passing over from the column at 69 to 70° C. consists of 91.4 per cent. of ethyl acetate, and 8.6 per cent. of an aqueous solution of formaldehyde containing on an average 11 per cent. of the latter, and again separates into its components after condensation in an ordinary condenser connected to a receiver. The ethyl acetate is separated from the aqueous layer and, it may be after extensive drying by means of interposed drying devices, returned to the main quantity in the flask, in which, with the further progress of the distillation, polymeric formaldehyde gradually separates in a form which, by filtration or light pressing and further drying for a short time at 100° C., can be entirely freed from the adhering solvent. In this way, there are obtained from 1000 gms. of a 35.5 per cent. by weight solution of formaldehyde, 245 gms. of a snow-white fine-grained product having a formaldehyde content of 98.5 per cent. The total quantity of the formaldehyde carried over by the water which has distilled off amounts in this case to 69.1 gms.=19.5 per cent. of the formaldehyde employed. The remaining 12.5 per cent. are contained in solution in ethyl acetate and do not represent any loss inasmuch as the ethyl acetate saturated in this manner with formaldehyde can be directly employed for further operations as well as in a continuous method of working.

In order to give an idea of the comparatively good solubility of the product obtained in this way, there will now be described comparative solubility experiments with a commercially usual product and the product prepared by the new process. 15 gms. of a product obtained in accordance with the above example and of a commercial paraform were each heated with 50 ccs. of water for about half-an-hour at 60 to 70° C. After the lapse of this time, the first mentioned product will have gone completely into solution from which nothing separates even on cooling to room temperature and standing for a fairly long time, whereas the commercial sample shows, under similar conditions, no solubility in water at all or only an imperceptible solubility in water as shown by a determination of formaldehyde in the filtrate.

As already mentioned, this comparatively good solubility is also lasting, because, obviously, owing to the very complete withdrawal of the water from the product, the tendency to further polymerization, even on storing for a long time, is not very great. For example, the following solubility values were found on observing a preparation made by the new process at intervals of a few months:—

Fresh preparation:
50 ccs. of water dissolve, at 60 to 70° C., 20 gms. of paraform.

Preparation one month old:
50 ccs. of water dissolve, at 60 to 70° C., 20 gms. of paraform.

Preparation three months old:
50 ccs. of water dissolve, at 70 to 80° C., 20 gms. of paraform.

Preparation six months old:
50 ccs. of water dissolve, at 80° C., 20 gms. of paraform.

Preparation six months old:
50 ccs. of water dissolve, at 60° C., 10 gms. of paraform.

In this case, all the experiments were carried out by heating the quantities stated of paraform for half-an-hour, when complete solution was effected in each case. The solubility figures found in this way thus represent in every way minimum values which will increase especially on prolonged heating. Thus, in any case, solutions of commercial strength can be produced with little trouble from such a readily soluble preparation.

What we claim is:—

1. In the production of readily soluble paraformaldehyde from formaldehyde by removal of water the step of incorporating with the aqueous formaldehyde an organic liquid capable of producing with the water an azeotropic mixture of low boiling point and distilling said mixture.

2. In the continuous production of readily soluble paraformaldehyde from formaldehyde by removal of water, incorporating in the aqueous formaldehyde an organic liquid capable of producing with the water an azeotropic mixture of low boiling point, distilling said mixture, condensing the vapors, separating the condensate into its components and returning the organic liquid component to the azeotropic distillation stage.

3. The production of readily soluble paraformaldehyde from aqueous formaldehyde, consisting in distilling an organic liquid capable of forming with the water of the formaldehyde solution an azeotropic mixture of low boiling point and gradually adding the aqueous formaldehyde to the distilling liquid.

4. The production of readily soluble paraformaldehyde from aqueous formaldehyde, consisting in distilling an organic liquid capable of forming with the water of the formaldehyde solution an azeotropic mixture of low boiling point and gradually adding the aqueous formaldehyde to the distilling liquid at a rate such that the water content of the added formaldehyde corresponds substantially with the water content of the azeotropic vapors being driven off.

OTTO FUCHS.
ERICH NAUJOKS.